(12) United States Patent
Knipping et al.

(10) Patent No.: US 10,092,993 B2
(45) Date of Patent: Oct. 9, 2018

(54) METHOD AND TOOL FOR INCREASING THE STRENGTH OF SHAFTS, IN PARTICULAR OF CRANKSHAFTS

(71) Applicant: HEGENSCHEIDT-MFD GmbH & CO. KG, Erkelenz (DE)

(72) Inventors: Daniel Knipping, Waldfeucht (DE); Helmut Hochbein, Siegen (DE)

(73) Assignee: HEGENSCHEIDT-MFD GmbH & CO. KG, Erkelenz (DE)

(*) Notice: Subject to any disclaimer, the term of this patent is extended or adjusted under 35 U.S.C. 154(b) by 814 days.

(21) Appl. No.: 14/377,706

(22) PCT Filed: Feb. 15, 2013

(86) PCT No.: PCT/DE2013/000097
§ 371 (c)(1),
(2) Date: Nov. 17, 2015

(87) PCT Pub. No.: WO2013/120480
PCT Pub. Date: Aug. 22, 2013

(65) Prior Publication Data
US 2016/0082570 A1   Mar. 24, 2016

(30) Foreign Application Priority Data
Feb. 16, 2012   (DE) ................. 10 2012 003 476

(51) Int. Cl.
*B23P 23/00* (2006.01)
*B24B 39/04* (2006.01)
*B23P 15/00* (2006.01)

(52) U.S. Cl.
CPC ............ *B24B 39/045* (2013.01); *B23P 15/00* (2013.01); *B24B 39/04* (2013.01); *B23P 2700/07* (2013.01)

(58) Field of Classification Search
CPC ....... B24B 39/045; B24B 39/04; B23P 15/00; B23P 2700/07
See application file for complete search history.

(56) References Cited

U.S. PATENT DOCUMENTS 8,020,293 B2 * 9/2011 Naumann ............. B21H 7/185
29/558
2009/0307886 A1   12/2009 Chiba et al.

FOREIGN PATENT DOCUMENTS

| JP | H04-115866 A | 4/1992 |
| JP | H04-191327 | 7/1992 |
| JP | 2006-346801 A1 | 12/2006 |

OTHER PUBLICATIONS

English Translation of the International Preliminary Report on Patentability (7 pages), incorporating the English Translation of the Written Opinion of the ISA for PCT/DE2013/000097, dated Aug. 19, 2014, IB/Geneva.

(Continued)

*Primary Examiner* — Richard Chang
(74) *Attorney, Agent, or Firm* — Harness, Dickey & Pierce, P.L.C.

(57) ABSTRACT

A method and compression roller tool for increasing the strength of load-bearing surfaces on shafts, in particular on crankshafts, which surfaces are pre-machined with the removal of chips, wherein the cylindrical surfaces of the main bearing journals and pin-bearing journals and optionally also the journal of crankshafts have additional oil bores. At least one of the load-bearing surfaces is compression-rolled by way of at least one cylindrical body which has a surface structure and extends over the width of the load-bearing surface. Afterwards, the compression-rolled load-bearing surfaces are machined with the removal of chips with a low chip depth. The compression roller tool consists of a cylindrical compression roller body and a supporting (Continued)

Figure 1:
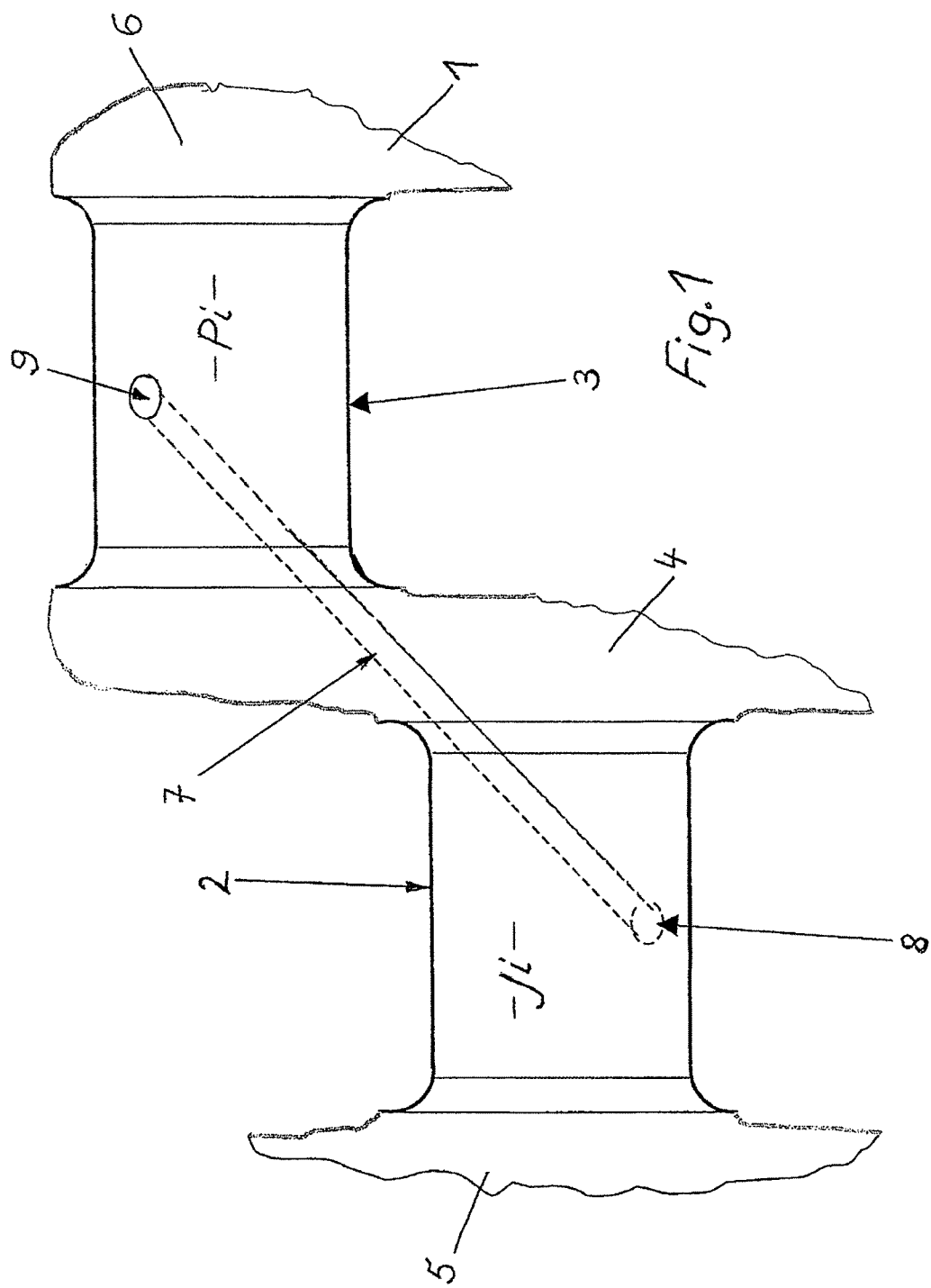

body opposite it, wherein the compression roller body has thickened portions on its cylindrical surface, which thickened portions run either in the circumferential direction or in the axial direction or diagonally with respect to the axial direction.

6 Claims, 3 Drawing Sheets

(56) References Cited

OTHER PUBLICATIONS

International Search Report for PCT/DE2013/000097, ISA/EP, Rijswijk, NL, dated Jul. 24, 2013 (4 pages).

* cited by examiner

METHOD AND TOOL FOR INCREASING THE STRENGTH OF SHAFTS, IN PARTICULAR OF CRANKSHAFTS

CROSS REFERENCE TO RELATED APPLICATIONS

This application is a 371 U.S. National Stage of International Application No. PCT/DE2013/000097, filed Feb. 15, 2013. This application claims the benefit of German Patent Application No. 102012002376.8, filed Feb. 16, 2012. The disclosures of the above applications are incorporated herein by reference.

FIELD

The invention concerns a method of increasing the strength of bearing surfaces on shafts, in particular the cylindrical surfaces of crankshafts which have been pre-machined for the purpose of material removal, and where the cylindrical surfaces of the main pin and the crankpin as well as the pin of the crankshaft have additional oil holes.

BACKGROUND AND SUMMARY

Crankshafts in car engines are mass-produced parts with lot sizes that stretch into the millions. Forged steel crankshafts are preferred for crankshafts exposed to high loads, e.g., in diesel engines. Significantly cheaper than these are cast iron crankshafts, which tend to be used in the area of normally loaded motors. Technical progress in engine development has led to higher gas forces and consequently greater loads being placed on crankshafts, and at the same time bearings have been downsized for reasons of energy consumption.

As a result, the load capacity of the bearings of steel or cast iron crankshafts is further reduced. High-load bearings are sometimes used in the field of mixed friction, and the way that the engines of modern vehicles usually cut out when there is no load—start-stop cycling—causes additional wear on the bearings. The calculated bearing gap when the engine is running is within a range below 1 µm. High-load bearings have very precise geometrical forms and require a very low surface roughness due their chemical affinity to the metal of the bearing shell. A hardened running surface is advantageous for the transport and handling of the crankshaft and in terms of the bearing's load capacity. To benefit from these advantages, only a very low hardening depth of around 1/10 mm is necessary.

Hardening is also used to protect the oil holes.

However, not only crankshafts have bearing surfaces on the main and pin bearings and on the pin. Camshafts also have comparable bearing surfaces, which roll on the heads of the cylinder valves. In contrast to the bearing surfaces of the crankshaft, the bearing surfaces of the camshaft have a profile composed of a large circle and a small circle. The goal of increasing the strength of the bearing surfaces applies equally to both types of shaft.

The hardening of bearing surfaces by means of induction hardening or nitration, for example, is well known to the relevant professionals. The same applies to the equipment for deep rolling bearing radii, so that there is no need to provide a description of this equipment in relation to the invention. Deep rolling, in comparison with hardening, is a cost-effective and very environmentally-friendly process. In the case of deep rolling, the running surface is deformed and deep rolled under high pressure by a deep rolling tool made from tool steel or carbide. Deep rolled surfaces are characterized by positive compressive residual stresses with a depth in the mm range. Thanks to the deep rolling process, strength is guaranteed even after the subsequent finishing work, and the bearing running surface is more resistant to surface damage during assembly transport or during motor operation. As a result, wear on the bearing is reduced during motor operation. The sliding bearing shells on the counter-running surfaces thus enjoy a longer service life.

Hence the task of this invention is to strengthen the running surfaces on main and pin bearings, and on the crankpin diameter and flange diameter of crankshafts made from steel or cast iron or other metallic compositions, using deep rolling rather than hardening, and thereby to increase the service life of combustion engines. The strength of the oil holes is also increased by means of deep rolling rather than hardening.

The applicant is aware of a related technologies from JP 2006 34 6801 A1 and WO 2006 135 014 A1.

The publication JP 2006 34 6801 A1 explains how to improve the structure of the surface of the bearing pin of a crankshaft which has no lateral recesses, and how to finishing roll the bearing pin in a particular way, even if it has an oil hole. A pair of finishing rollers is provided for this purpose, which are designed in an identical disk shape. On their circumference, which rolls on the bearing pin, the finishing rollers have one to four projections, between which, in an axial direction, there are intermediate spaces of an equal size. The intermediate spaces between adjoining projections are larger than the inner-diameter of an oil hole. In the case of surfaces which have been finishing rolled in this way, a subsequent removal of material via machining with a low cutting depth can of course be dispensed with, so that a shaft structure is rolled into the bearing pin. The oil holes are deliberately not machined.

A method and a device for finishing rolling crankshafts are known from the publication WO 2006 135 014 A1. A pair of disk-shaped finishing rollers is placed on either side of the bearing pin of a crankshaft, opposite each other and at the same height. The crankshaft is caused to rotate by a source of power. The pair of finishing rollers are moved away from each other, while the bearing pin of the crankshaft is held by the outer circumference surface of the finishing rollers, which cause the finishing rolling of the crankshaft. In this publication, nothing is said about whether a surface structure is inserted in the finishing rolled bearing pin at the same time as the finishing rolling.

The task of the invention is achieved by deep rolling at least one bearing surface with at least one cylindrical deep roller, which has a surface structure and extends across the width of the bearing surface, and finally by machining the deep rolled bearing surface with a low cutting depth for the purpose of removing material.

Deep rolling is preferably carried out with three cylindrical deep rollers simultaneously.

Primarily the cylindrical surfaces on the main pins and crankpins of crankshafts are deep rolled. However, the flange of a crankshaft can also be machined in this way, in order to increase its surface strength and thereby prevent the occurrence of scores, which form during operation and through which oil can seep.

Even a crankshaft pin with an oil hole can be deep rolled in the same manner.

Primarily the main pin, the crankpin and the pins of crankshafts are deep rolled with a cylindrical deep roller which has a point-shaped swelling in the area of the oil hole.

For deep rolling, several cylindrical deep rollers are used, which have swellings arranged in a row along the width of the cylindrical surface being deep rolled.

After completion of the deep rolling process using deep rollers with a structured surface, further material removal via machining with a low cutting depth is required to restore the geometrical precision of the deep rolled surfaces. The bearing surfaces which have been reworked in this manner are finally burnished, for example, by means of finishing rolling or surface treatment with a laser beam.

A deep rolling tool for performing the process includes at least one cylindrical deep roller and at least one support element, which is located opposite the deep roller in relation to the profile of the bearing surface being deep rolled. The deep roller also features swellings or indentations on its cylindrical surface, which may run in the circumferential direction, the axial direction or diagonally to the axial direction.

Deep rollers with indentations in a diamond pattern on their cylindrical surface have proven particularly suitable. When several deep rollers are employed, they are situated opposite each other in relation to the profile of the bearing surfaces being deep rolled.

When three deep rollers are used in a deep rolling tool, it has proven advantageous when the deep rollers are situated in a triangular arrangement in relation to the profile of the bearing surface being deep rolled.

It is advantageous when the surface structures of at least two deep rollers follow one another. In the case of three deep rollers, one deep roller can be designed as a support which has a smooth cylindrical surface. However, one of the deep rollers should have a point-shaped swelling on its otherwise smooth cylindrical surface, which is situated at exactly the point that strikes an oil hole on the bearing surface when the deep roller is rolling on that surface.

DRAWINGS

Figure 2:
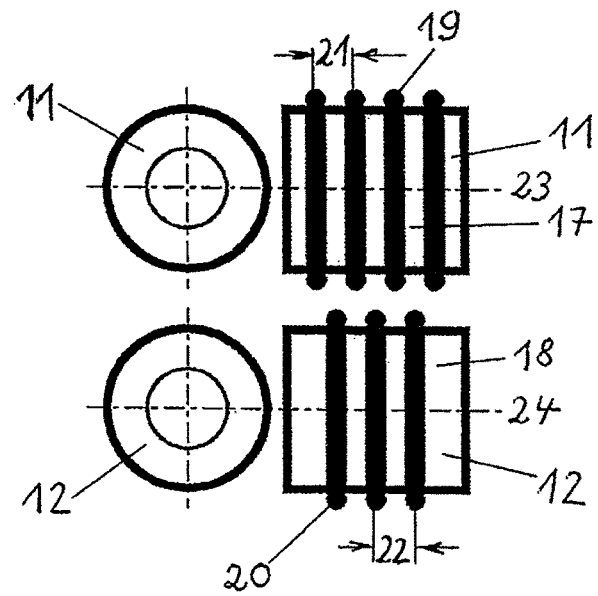
Figure 3:
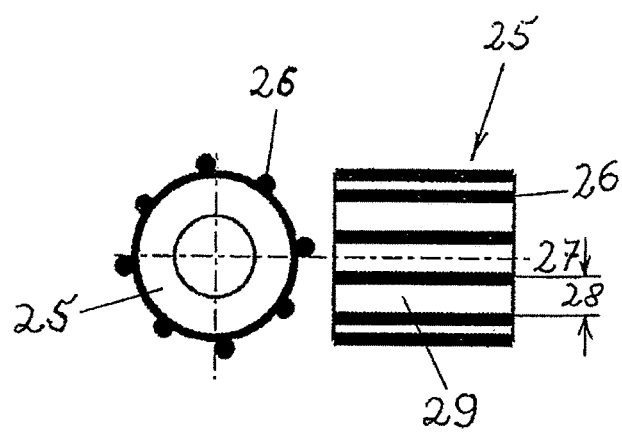
Figure 4:
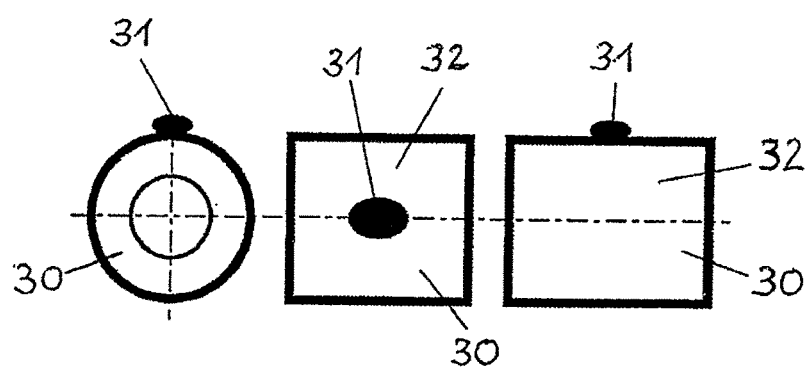
Figure 5:
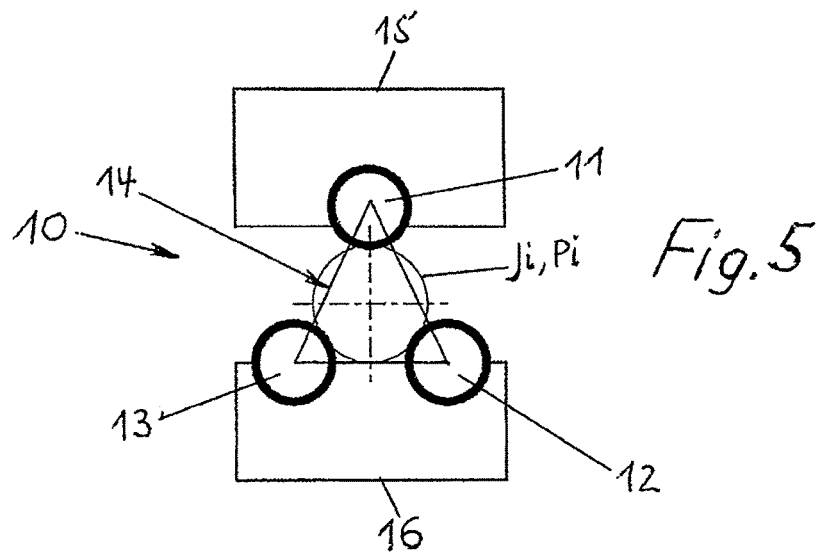
Figure 6:
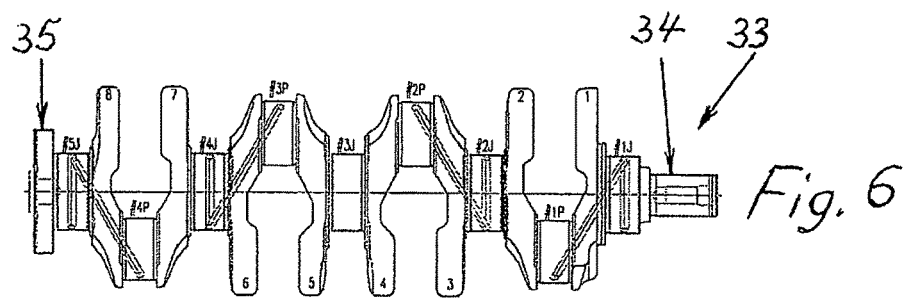
Figure 7:
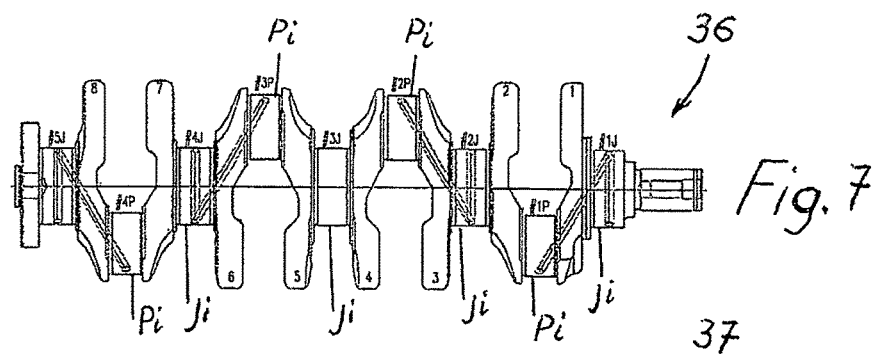
Figure 8:
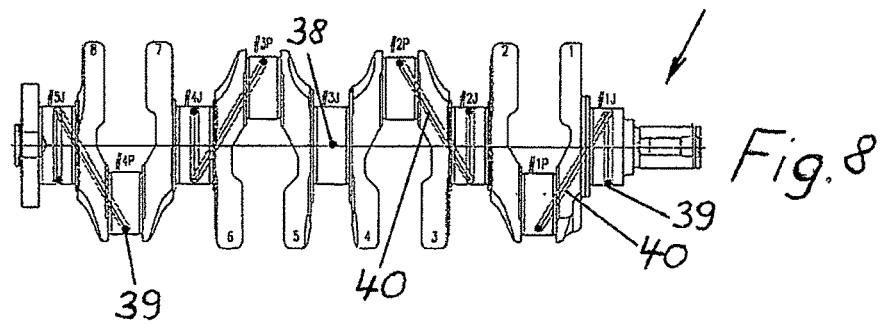

FIG. 1 shows a longitudinal section of a crankshaft;
FIG. 2 shows two corresponding deep rollers, each in front and side view;
FIG. 3 shows a deep roller in front and side view;
FIG. 4 shows a deep roller with a point-shaped swelling in front and side view as well as in plan view;
FIG. 5 shows a possible arrangement of deep rollers in a deep rolling tool, and then in a reduced scale;
FIG. 6 shows the main bearing pin as well as the pin and flange of a crankshaft;
FIG. 7 shows the crankpin; and
FIG. 8 shows the distribution of the oil holes on the crankshaft.

DETAILED DESCRIPTION

The invention is described in detail below using a design example. A mostly schematic depiction, which is not drawn to scale, can be seen in the figures.

FIG. 1 shows a longitudinal section of a crankshaft 1 with a main bearing pin Ji and a crankpin Pi. The cylindrical bearing surfaces are designated by the numbers 2 and 3. A section of a web 4 is indicated between the main bearing pin Ji and the crankpin Pi. Further web sections 5 and 6 can be seen adjoining the outer ends of FIG. 1. Indicated by broken lines is an oil hole 7 with the respective openings 8 and 9 on the cylindrical bearing surfaces 2 and 3.

It is intended to deep roll the cylindrical bearing surfaces 2 and 3 with a deep rolling tool 10, as shown in FIG. 5. In the case of the deep rolling tool 10, there are three cylindrical deep rollers 11, 12, and 13 arranged around a main bearing pin Ji or a crankpin Pi. As clearly shown in FIG. 5, the three deep rollers 11, 12 and 13 are configured in a triangle 14. While deep roller 11 is held in a deep roller housing 15 of its own, deep rollers 12 and 13 are held in a common housing 16.

For example, deep rollers 11 and 12, the side and front view of which are shown in FIG. 2, have swellings or projections 19 and 20 on their cylindrical surfaces 17 and 18. Swellings 19 and 20 are bead-shaped elevations which extend across the circumference of the respective cylindrical surfaces 17 and 18. It is apparent that there is always a gap 21 between the swellings 19 on the deep roller 11. The same applies to the swellings 20 on the cylindrical surface 18 of deep roller 12 with the swellings 20. Here too, there is a gap 22 between the relevant swellings 20. It is also apparent from FIG. 2 that the swellings 20 of the deep roller 12 are situated exactly opposite the gaps 21 on the deep roller 11. This means that the swellings 19 and 20 are arranged side by side in the direction of the rotational axes 23 and 24 of deep rollers 11 and 12. The close proximity of the swellings results in a continuous pattern on the deep rolled bearing surfaces 2 and 3. The swellings 19 and 20 are not high; they are raised between 0.1 and 0.5 mm above the relevant cylindrical surfaces 17 and 18. The width of the swellings is also small and lies between 0.1 and 0.5 mm, preferably 0.2 mm. The same applies to the spaces 21 and 22 between the swellings; they are generally between 0.1 and 1 mm apart, preferably 0.5 mm. Nevertheless, the deep rolling of the bearing surfaces 2 and 3 generates a positive internal pressure, which reaches to a depth in the millimeter (mm) range. Thanks to the deep rolling process, strength is guaranteed even after the subsequent finishing work, and the bearing running surface 2 and 3 is more resistant to surface damage caused by assembly transport or motor operation.

FIG. 3 shows another type of deep roller 25 in the side and front view. Deep roller 25 also has swellings 26 which are comparable to the swellings 19 and 20 on deep rollers 11 and 12. By way of contrast, however, the swellings 26 are arranged in the direction of the rotary axis 27 of the deep roller 25, as is clearly shown in FIG. 3. These swellings 26 also have spaces 28 between them.

If there was a second roller depicted in FIG. 3, it would have the same design, analogous to the illustration in FIG. 2. Here too, the swellings 26 between the two deep rollers would mesh into each other.

Apart from the radial and axial arrangement of the swellings 19, 20 or 26, other arrangements are also possible, for example, running diagonally across the cylindrical surfaces 17,18,29. Arrangements of this type would generate diamond, undulating or other patterns, on bearing surfaces 2 and 3 for example.

The openings 8 and 9 of oil hole 7 present a particular problem. The openings 8 and 9 also require extra strengthening, to prevent the possible formation and spreading of cracks from there. A special deep roller 30 is designed for this type of strengthening, as illustrated in FIG. 4 in side, plan and front view. Deep roller 30 features a lens-shaped swelling or oval-shaped projection 31 on its cylindrical surface 32. The lens-shaped swelling 31 is arranged in such a way that it always strikes the relevant opening 8 or 9 of the oil hole 7 when the deep roller 30 is rolling on one of the bearing surfaces 2 or 3. The lens-shaped swelling 31 is raised approx. between 0.1 and 1.5 mm above the cylindrical surface 32.

A lens-shaped swelling 31, illustrated separately in FIG. 4 for purposes of special clarification, can, however, also be located on deep rollers 11, 12 or 25.

FIG. 6 shows the side view of a crankshaft 33 in reduced scale. The crankshaft 33 has the main bearing pins 1J to 5J. The crankpins 1P to 4P are located between the main bearing pins Ji. The pin 34 forms the start of the crankshaft 33; the flange 35 forms its end. In addition to the deep rolling of the main bearing pin Ji in accordance with the invention, the cylindrical surfaces of the pin 34 and the flange 35 are also deep rolled.

The crankpins P are specially highlighted in FIG. 7. Here, to illustrate the application of the invention, it is intended that crankpins 1P to 4P should be deep rolled in accordance with the invention.

In the case of crankshaft 37 shown in FIG. 8, the openings 38 and 39 of the oil holes 40 are the focus of attention. Due to deep rolling, the edges of the openings 38 and 39 of the oil holes 40 are rounded.

The invention claimed is:

1. A tool for deep rolling a cylindrical bearing surface on a crankshaft comprising:
   a first housing supporting a first roller for rotation about a first axis;
   a second housing supporting both a second roller for rotation about a second axis and a third roller for rotation about a third axis;
   wherein the first roller comprises a plurality of first projections extending from an outer surface of the first roller, the plurality of first projections being spaced apart equally on the outer surface of the first roller for a first distance to thereby create a plurality of first gaps between adjacent ones of the first projections; and
   wherein the second roller comprises a plurality of second projections extending from an outer surface of the second roller, the plurality of second projections being spaced apart equally on the outer surface of the second roller a second distance substantially equal to the first distance to thereby create a plurality of second gaps between adjacent ones of the second projections;
   wherein the first, second and third rollers are arranged in a triangular pattern around the bearing surface of the crankshaft and the first, second and third axes are parallel;
   wherein the first projections of the first roller are aligned with the second gaps of the second roller and the second projections of the second roller are aligned with the first gaps of the first roller; and
   wherein the first and second projections extend across a width of the bearing surface.

2. The tool of claim 1, wherein the first and second projections extend circumferentially around the respective outer surfaces of the first and second rollers in a direction perpendicular to the respective first and second axes of rotation.

3. The tool of claim 1, wherein the first and second projections extend longitudinally across the respective outer surfaces of the first and second rollers in a direction parallel to the respective first and second axes of rotation.

4. The tool of claim 1, wherein the first and second projections extend diagonally across the respective outer surfaces of the first and second rollers in a direction generally along the respective first and second axes of rotation.

5. The tool of claim 1, wherein the third roller comprises a smooth outer surface.

6. The tool of claim 5, wherein the third roller further comprises a single oval-shaped projection extending from the outer surface of the third roller and positioned on the outer surface of the third roller such that it aligns with an opening of an oil hole on the cylindrical bearing surface of the crankshaft when being deep rolled by the tool.

* * * * *